(12) United States Patent
Bell (10) Patent No.: US 8,990,898 B2
(45) Date of Patent: Mar. 24, 2015

(54) CONNECTION LEASING FOR HOSTED SERVICES

(75) Inventor: Kenneth Malcolm Bell, Bassingbourn (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 344 days.

(21) Appl. No.: 13/398,008

(22) Filed: Feb. 16, 2012

(65) Prior Publication Data

US 2013/0219468 A1 Aug. 22, 2013

(51) Int. Cl.
G06F 21/00 (2013.01)
G06F 9/46 (2006.01)
H04L 29/08 (2006.01)

(52) U.S. Cl.
CPC ............... *G06F 9/468* (2013.01); *H04L 67/14* (2013.01)
USPC .................................................. 726/4; 726/6

(58) Field of Classification Search
CPC ......... G06F 9/468; H04L 67/14; H04L 67/38; H04L 63/08; H04L 63/0807
See application file for complete search history.

(56) References Cited

U.S. PATENT DOCUMENTS

| | | | |
|---|---|---|---|
| 6,161,182 A | 12/2000 | Nadooshan | |
| 6,247,026 B1 | 6/2001 | Waldo et al. | |
| 7,249,176 B1 | 7/2007 | Salas et al. | |
| 7,259,176 B2 | 8/2007 | Goehring et al. | |
| 2002/0095571 A1* | 7/2002 | Bradee | 713/164 |
| 2003/0033535 A1 | 2/2003 | Fisher et al. | |
| 2006/0010442 A1 | 1/2006 | Desai et al. | |
| 2011/0023096 A1 | 1/2011 | Xiao et al. | |
| 2011/0030045 A1 | 2/2011 | Beauregard et al. | |
| 2012/0096271 A1* | 4/2012 | Ramarathinam et al. | 713/172 |

FOREIGN PATENT DOCUMENTS

| | | |
|---|---|---|
| WO | 9944130 A1 | 9/1999 |
| WO | 0155819 A1 | 8/2001 |

OTHER PUBLICATIONS

International Search Report dated Jun. 11, 2013, corresponding PCT Application PCT/US203/025817.
SolarWinds, "What is a Connection Broker", downloaded on Apr. 30, 2012 from <www.solarwinds.com/it-management-glossary/what-is-connection-broker.aspx>.

(Continued)

*Primary Examiner* — Jeffrey Pwu
*Assistant Examiner* — Nega Woldemariam
(74) *Attorney, Agent, or Firm* — Banner & Witcoff, Ltd.

(57) ABSTRACT

Aspects herein describe brokering hosted resources in a virtual desktop infrastructure (VDI) using connection leases to reduce demand on connection brokers and to allow hosted services to be maintained even in the event of a broker outage. When a client device desires to connect to a hosted resource (e.g., a hosted desktop or a hosted application), the client device may present a lease token to the session host. The lease token is a self-sustaining package of data from which a session host can determine whether the requesting client device is authorized to access one or more resources hosted by that session host. The lease token may be cryptographically signed to ensure its contents have not been altered, and further that the lease token originated from a trusted source. Lease tokens may be stored independently from a connection broker, thereby still being usable if the connection broker goes offline.

20 Claims, 6 Drawing Sheets

(56) References Cited

OTHER PUBLICATIONS

ClearCube, "ClearCube Sentral—Award Winning Software", downloaded on Apr. 30, 2012 from <www.clearcube.com/sentral-pc-management-virtual-desktop-management.html>.

Microsoft Corporation, "Windows Server 2008 R2, Deploying Remote Desktop Connection Broker with High Availability Step-by-Step Guide", May 2010.

Leostream, "Connection Broker Virtual Appliance Administrator's Guide", version 7.x, Feb. 8, 2012.

Microsoft TechNet, "Remote Desktop Connection Broker", downloaded on Apr. 30, 2012 from <technet.microsoft.com/en-us/library/dd560675(d=printer,v-ws.10).aspx>.

* cited by examiner

| Parameter | Value | |
|---|---|---|
| Devices [specifies a set of one or more permissible devices] | User device A, User device B,...User device N | 501 / 513 |
| Session Hosts [specifies a set of one or more permissible session hosts, with connection details] | Session_host_1: Addr_1, Session_host_2: Addr_2,...Session_host_M: Addr_M | 507 |
| Connection Limit [A positive integer. 0 = no connection limit; refer instead to time-based constraints] | 0 | 503 |
| Start [defines when the lease begins; 0=immediately; otherwise a specific date/time may be used] | 0 | 505A |
| Expiration [defines when the lease ends; 0=no expiration (refer instead to connection limit); otherwise a specific date/time may be used] | 06:00:00, October 31, 2011 | 505B |
| Resources [list of resources that may be accessed using this lease token, including any required connection information such as file path, etc.] | Resource_1; Resource_2; ...; Resource_X | 509 |
| Conditions [any access conditions, e.g., virus definitions=current] | Condition_1; Condition_2 | 515 |
| Encrypted Hash [hash value of predetermined set of information in the lease, e.g., a hash based on all of the above information, and encrypted using the private key of the connection broker] | Hash_Value | 511 |
| Max Idle Time | 00:15:00 | 517 |
| Max Disconnect Time | 00:20:00 | 519 |
| Channel Control | | 521 |
| Lease ID | 0878974589 | 523 |

CONNECTION LEASING FOR HOSTED SERVICES

FIELD

Aspects described herein relate to computer systems, computer networks, and desktop virtualization. More specifically, aspects described herein relate to the use of connection leases in desktop virtualization systems to provide connectivity to remote desktops and remote applications by a client device.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. Multi-server desktop virtualization systems often include additional computing devices and/or shared storage to provide a common system management portal and to maintain global state information. Such systems often use the external shared storage, along with database and enterprise server software within the virtualization servers, to manage the system.

When a user desires to connect to a virtual desktop, the user's local software client contacts a connection broker to establish a session with a remote desktop or other resource. Conventional connection brokers are said to be "inline" and thus involved in all decisions to determine where to direct a user's session. Stated differently, all connections must be initiated through and established with the assistance of the connection broker. As a result, the connection broker is a critical piece of infrastructure because an outage of the broker infrastructure will result in a large-scale deployment outage, i.e., users will not be able to connect with hosted resources.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe new methods and systems of brokering by using "connection leases" that allow service to be maintained even in the event of a broker outage. According to some aspects, connection leases also serve to reduce the load placed on brokering infrastructure, thereby enabling higher-scale deployments.

According to a first aspect, a lease token data structure may be used to define a self-sustaining lease token. The data structure may include a first data field identifying a lease token identification number, a second data field identifying one or more client devices, a third data field identifying one or more session hosts accessible by the one or more client devices, and a fourth data field identifying one or more resources usable by the one or more client devices on the one or more session hosts, wherein each resource is one of a hosted desktop and a hosted application. The data structure may further include a fifth data field identifying a connection limit constraining when the one or more client devices can access the one or more session hosts, a sixth data field identifying one or more access conditions that must be met by the one or more client devices in order to access the one or more session hosts, a seventh data field identifying virtual channel information usable by the one or more session hosts to allow or deny access by the one or more clients to one or more virtual channels on the one or more session hosts, and an eighth data field storing a signature usable by the one or more session hosts to verify that the lease token data structure is unaltered and originated from a trusted connection broker.

According to another aspect, a session host apparatus may include a processor controlling operations of the session host apparatus, and memory storing computer readable instructions that, when executed by the processor, cause the session host apparatus to establish a session with a session client using a connection lease. The session host receives a lease token associated with a session client, where the lease token is a self-sustaining package of data from which the session host apparatus can determine whether the session client device is authorized to access one or more resources hosted by that session host. The session host apparatus determines, based on the lease token, one or more resources, hosted by the session host apparatus, that the session client is authorized to access. The session host apparatus sends connection information to the session client based on the determined resources, after determining that the session client is authorized to access the one or more resources, and the session host apparatus then establishes a session with the session client to provide access to the one or more determined resources.

Yet another aspect described herein provides a method for establishing a session using a connection lease. Initially, a connection broker receives a request for a session from a client device. The connection broker determines, based on an identification of the client device, one or more session hosts the client device is authorized to access, and one or more resources the client device is authorized to use on the one or more session hosts. The connection broker then generates a lease token based on the client device, the one or more session hosts, and the one or more resources, where the lease token is a self-sustaining package of data from which each of the one or more session hosts can determine whether the client device is authorized to access the one or more resources hosted by that session host. The connection broker sends the lease token for storage in a lease store. A session host receives the lease token as a request to establish a session with the client device, and the session host validates the lease token. Based on the validating, the session host sends connection information for use by the client device to establish a session with the session host, and establishes the session between the session host and the client device through which the client device accesses one or more resources hosted by the session host.

BRIEF DESCRIPTION OF THE DRAWINGS

Having thus described aspects of the disclosure in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
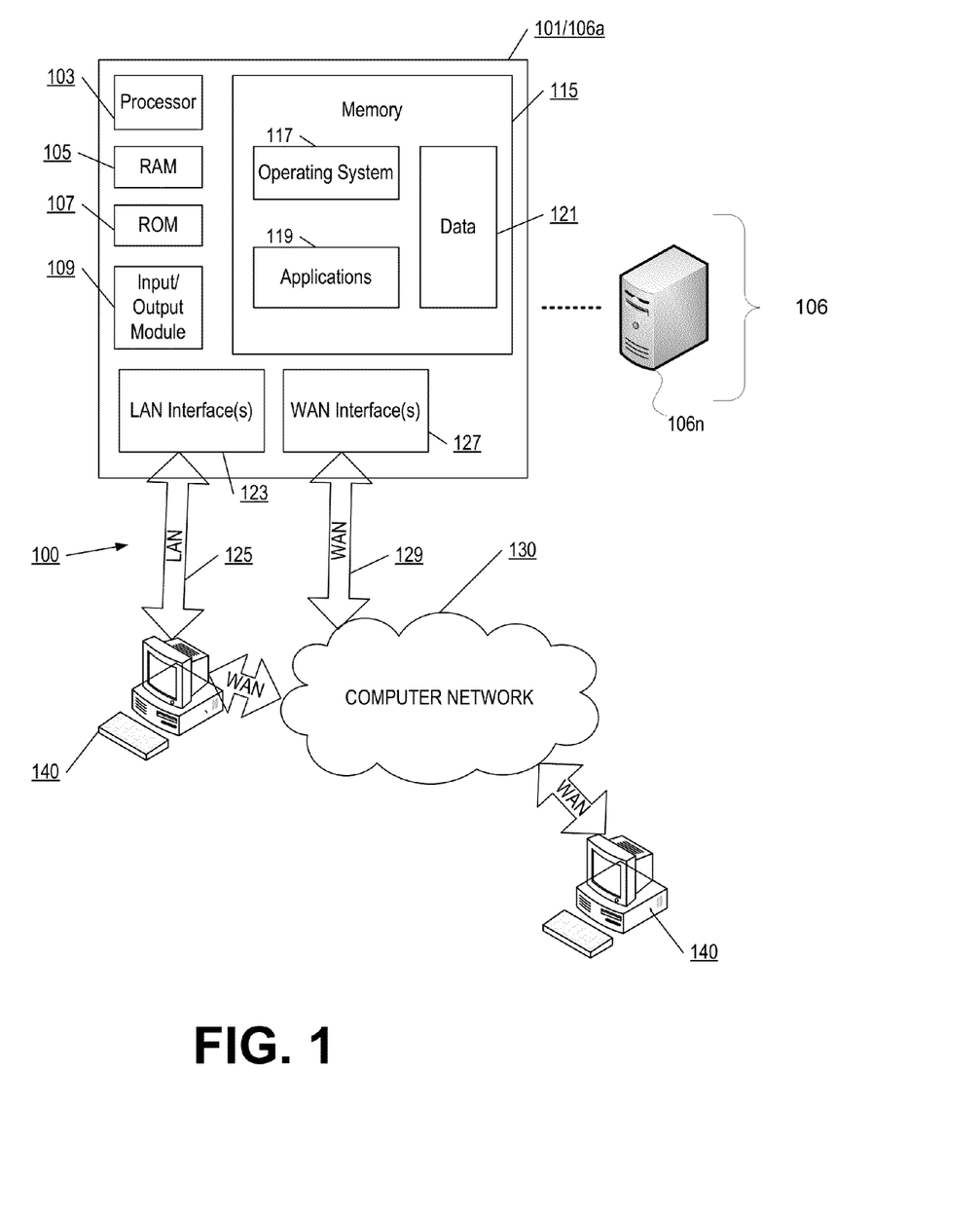
FIG. 1 illustrates an example operating environment in which various aspects of the disclosure may be implemented.

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiment be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., Windows Server, manufactured by Microsoft Corp. of Redmond, Wash., UNIX, LINUX, iOS, or LION, etc.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106n, and responds to the request generated by the client machine 140 with a response from the second server 106n. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like XENAPP, XENDESKTOP, METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
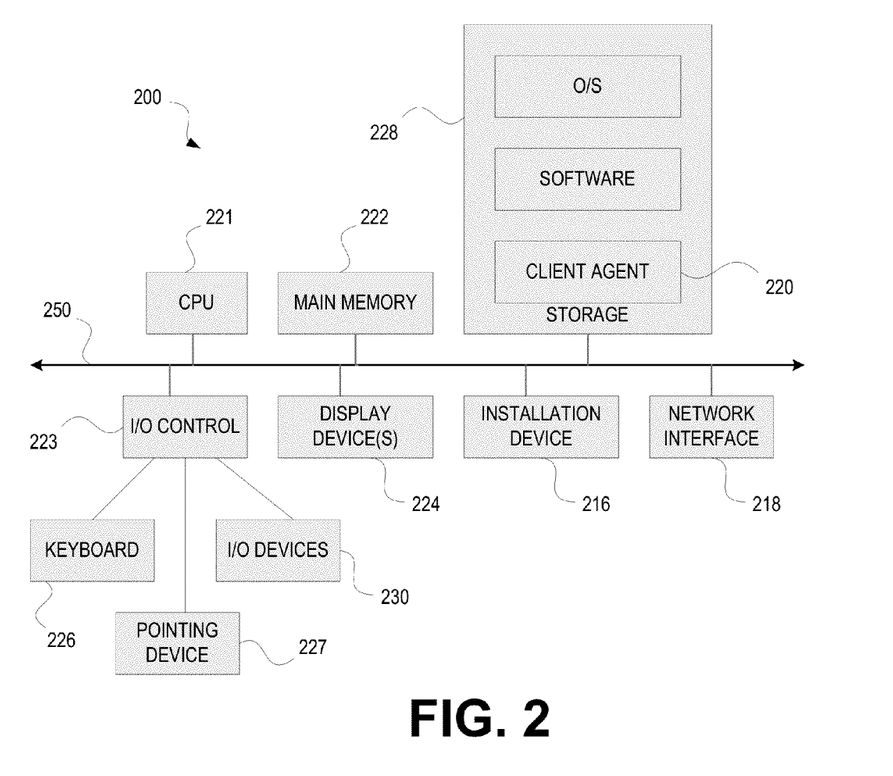
FIG. 2 illustrates a client device that may be used in accordance with one or more illustrative aspects described herein.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

Figure 3:
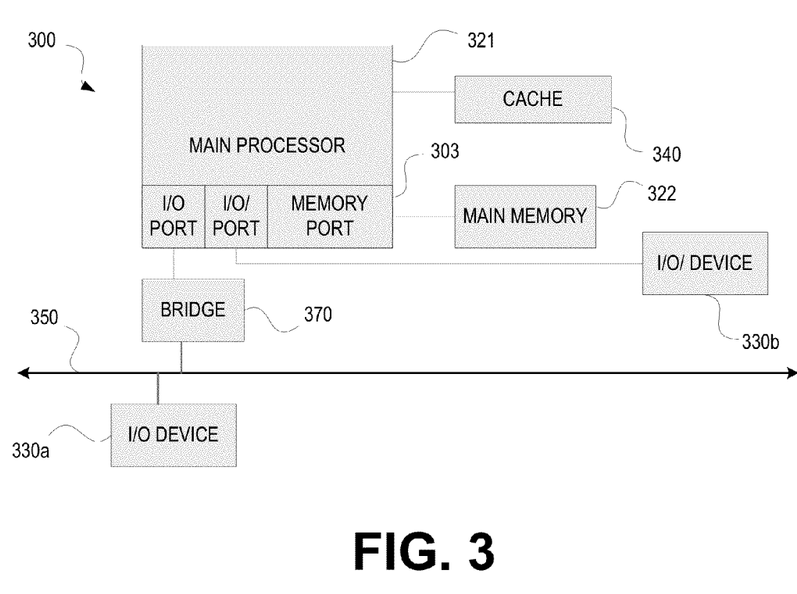
FIG. 3 illustrates a client device that may be used in accordance with one or more illustrative aspects described herein.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330a. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; WINDOWS VISTA, WINDOWS 7, WINDOWS SERVER, and the like; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Having described in FIGS. 1-3 various examples of desktop virtualization systems, and certain software and functionality that may be included in servers 106 of such systems, the following paragraphs provide additional examples of various methods and systems relating to using connection leasing as a brokerage model for establishing user sessions with remote resources.

Connection leasing is most effective in scenarios where a typical user connects to a relatively small number of session hosts (virtual desktops or remote desktop services (RDS) servers) from a relatively small number of client devices, and that over time a brokering decision is stable, e.g., the brokering decision made yesterday is likely to be the same decision made today, and will be the same decision made tomorrow. When brokering decisions remain constant over time, it becomes an unnecessary waste of resources to require a user to complete the entire inline brokering process each time the user desires to connect to a session host, because the brokering decision will likely remain unchanged insofar as the user is granted the same rights to the same or similar session host(s). However, even in scenarios where brokerage decisions change regularly, there are still benefits to be gained from using the leasing model described herein.

Figure 4:
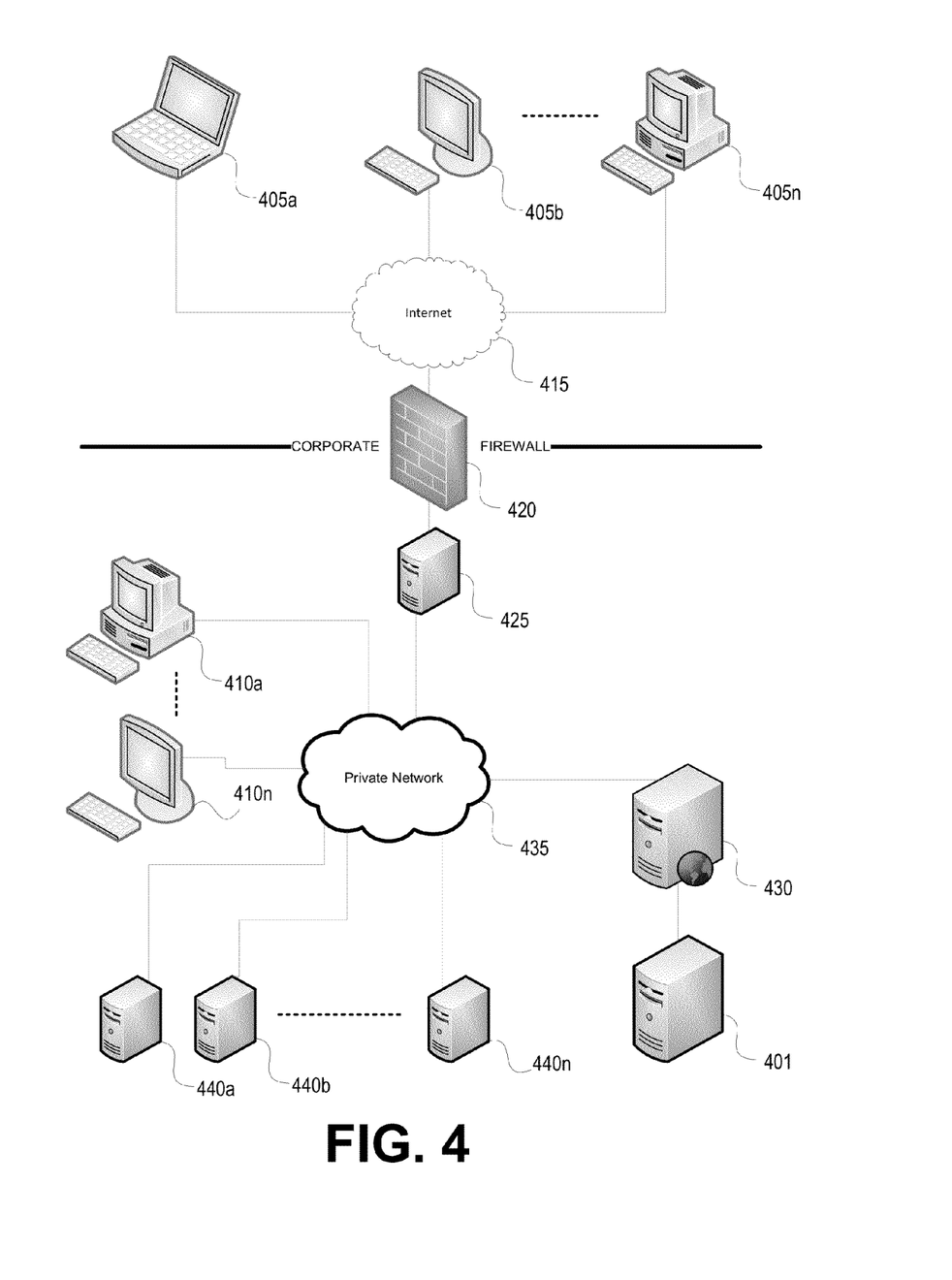
FIG. 4 illustrates a system architecture in accordance with one or more illustrative aspects described herein.

With reference to FIG. 4, one or more external client devices 405a-405n may communicate with connection broker 430 via one or more networks 415, 435. Network 415 may include a public network such as the Internet. Network 435 may include a private network such as a corporate LAN, WAN or the like, protected by firewall 420. Any other networks may also be used.

External client device 405 may communicate through firewall 420 via an edge device 425, such as an access gateway, virtual private network (VPN) server, or the like. Web server 430 may include an externally facing aspect and an internally facing aspect for communicating with external client devices 405 and internal client devices 410, respectively. Alternatively, a single logical web server may be adapted or configured to communicate with all client devices. Web server 430 communicates with connection broker 401 to handle requests for sessions with virtualized resources, as further described herein. In some aspects web server 430 and connection broker 401 are physically and/or logically separate devices. In other aspects web server 430 and connection broker 401 may be physically and/or logically combined.

Connection broker 401 may receive login credentials from users at client devices 405, 410 (e.g., via a web server 430 or other client-server configuration), and then creates and/or assigns resources to authorized users, and provides management consoles to authorized administrators. Each resource, e.g., a hosted application, hosted resource, virtual machine, or the like, may be hosted by one or more session hosts 440a-440n.

Figure 5:
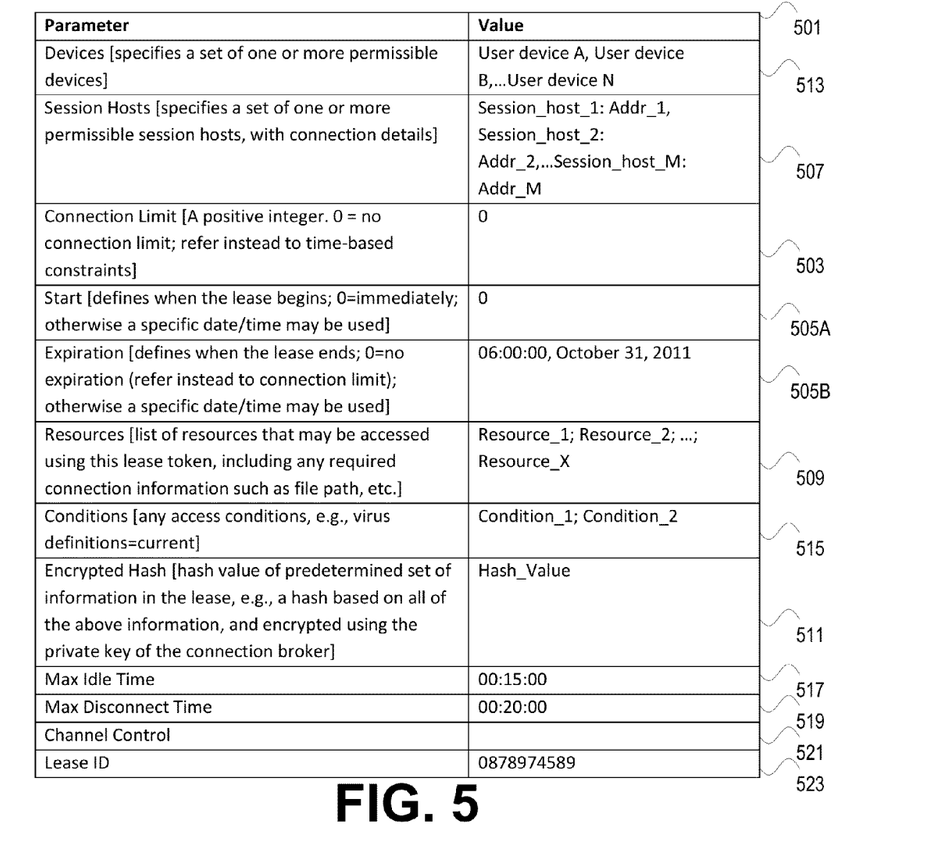
FIG. 5 illustrates data that may be included in a lease token, according to one or more illustrated aspects described herein.

With reference to FIG. 5, connection broker 401, acting as a lease issuer, may issue a connection lease that can be used multiple times. A connection lease may be thought of as a static assignment of a client device and/or user to a particular session host (or hosts) having a particular set of resources. The lease may be defined by a lease token 501 stored as a data package, e.g., in XML or other suitable format. As used herein, a lease token is a self-sustaining package of data from which a session host can determine whether a client device is authorized to access one or more resources (e.g., applications, desktops, printing services, audio services, virtual channels, etc.) hosted by that session host, as well as whether the client device is authorized to expose client-side resources to the session host (e.g., attached peripherals, printer, etc., attached to client). The session client may need additional information to complete session establishment, but the session host can independently determine that the session client is authorized without querying a connection broker (except as to possible lease token revocation, as further discussed below).

The lease token defines the authorizations provided by a particular lease, and may be defined to be valid for some period of time, e.g., for a discrete number of connections 503 or for a specified duration of time 505A, 505B. A lease token may include information 507 usable by a client device (endpoint device) to directly initiate a connection to a specified set of session hosts, such as DNS or IP addresses. While the specified set of session hosts 507 may typically be few in number, any set of session hosts may be specified. Each lease token may further include identities of one or more resources 509 that the user may access on the specified session hosts. The resources may include a desktop and/or individual applications. The connection lease may further specify information necessary for the user to access the leased resources, e.g., file paths to one or more authorized applications.

Each connection lease may be cryptographically signed 511 so that a session host can verify the validity of the lease without needing to communicate with a broker. For example, in a public key infrastructure (PKI), each connection lease might be signed and/or encrypted using a private key of the broker 401, and each session host can verify the lease by authenticating or decrypting the connection lease using the public key of the trusted broker. The session host can thereby ensure that the information included in the lease is provided by a trusted broker. The broker may further include a hash value associated with the lease token to ensure that the lease is not improperly altered or changed after issuance by the broker and before use by a user or device.

According to some aspects, additional security may be included in lease tokens to prevent misuse. In one example, a lease may include information that can be compared by the session host against the attributes of any requested connection, including but not limited to, the identity 513 of the user or of devices from which a connection can be established (so that a stolen lease token cannot be misused), the validity period 505 of the lease token (so that a token cannot be used indefinitely), one or more access conditions 515 (such as the client device's anti-virus state, which may be determined by a network device such as an Access Gateway), and access or logon hours.

According to yet other aspects, the lease token may also include information usable by a session host to implement a security policy. Such information may include a maximum idle time 517 before automatic disconnection, maximum disconnected time 519 before automatic logoff, and control of which devices may be used 521 (virtual channel control). Virtual channel control refers to the ability to control a printer channel, video channel, audio channel, etc., during the virtualized session.

Once a broker issues a lease token, the tokens themselves may be stored on a client device (endpoint device) or other locations. By storing the lease token on the endpoint device, however, only the endpoint device, network and session host need to be available in order for a session to be established. If a connection broker is unavailable, the session can still be established provided the lease token remains valid. In another example, the lease token may be stored on a network device or server, such as an access gateway, web interface, or other device located at the edge of the network. In yet other examples, lease tokens may be stored on the connection brokers themselves so that the brokers can continue to offer service in the event of a database outage. In addition, each lease token may be stored in multiple locations for redundancy, e.g., on the endpoint device as well as on the connection broker. Because each lease token defines its parameters of acceptable use (e.g., permitted user, permitted user device(s), permitted sessions host(s), permitted connections, permitted resources, etc.), there is no risk of unauthorized use based on duplication of lease tokens.

Figure 6:
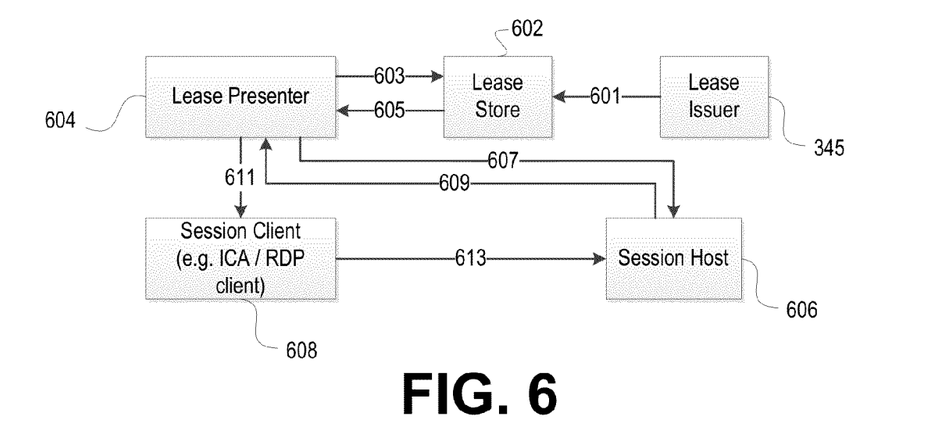
FIG. 6 illustrates a data flow diagram for a method using connection leases with a legacy session client, according to one or more illustrated aspects described herein.

With reference to FIG. 6, currently deployed virtualization software expects to initiate a connection using a traditional inline connection broker, and thus may need to be adapted for use with the inventive connection lease system described herein. In order to establish backwards compatibility with existing virtualization systems and software, a lease store 602 and lease presenter 604 may be established. The lease store 602 is a central repository, or repositories, where lease tokens may be stored. There may be more than one lease store 602 in a given virtualization system, e.g., one lease store per lease presenter, or some other amount. The lease presenter refers to a software service introduced between the session client and the connection broker, that in effect intercepts a session client's request to a connection broker, and determines whether there is already an existing lease token for that session client. Lease presenter 604 may reside, for example, at the edge of a network, or at a network gateway (e.g., in server 425), and may be replicated in multiple locations around the edge of the network. This is unlike the connection broker, which typically exists in only a single instance within each virtualization system.

Using the lease presenter 604 and lease store 602, a legacy session client 608 may establish a session using lease tokens as follows. When a user desires to establish a connection with a session host 606, the user logs in or presents authentication credentials and the session client calls the connection broker to obtain connection information, expecting to receive a typical ICA or RDP file. The lease presenter 604 intercepts the call to the connection broker and, upon verifying the user and or client's credentials, checks the lease store 602 for an existing lease token for that session client. If no lease token exists, or no lease token exists with suitable constraints (e.g., attempting to connect outside of logon hours, or with a different client device), then the lease presenter may query the connection broker 401 for a new token for the session client, and then in step 601 the lease token is stored in lease store 602.

In step 603, the lease presenter requests the lease token from the token store, and in step 605, the lease token is provided to the lease presenter. The lease presenter then presents the lease token to one or more session hosts in step 607 as defined by the lease token. The lease presenter may further provide confirmation to the session host that the user has already been authenticated. Alternatively the lease token may be delivered to the session host by a network device, virtual machine (VM) or other server such as an Access Gateway, Web Interface, Delivery Services or the broker itself (any of which can act as the "lease presenter"), after intercepting the initial request from the session client. As part of "presenting" the lease, the lease presenter may request one-time connection tickets, logon tickets, etc., or any other information required to generate a typical launch file.

The session host(s) may verify the lease token, and further verify the user's authenticity if needed. Each session host may represent or administer multiple desktops, applications, and/or other hosted services. Thus, in step 609 the session host determines which hosted service the session client is to be connected to, and returns additional connection details to the lease presenter. The additional connection details may include an IP address or DNS specific to the desktop or other hosted service, and any other information needed by the lease presenter to generate a launch file. For example, the session host may have a first IP address, but the session host may indicate an alternative address that client devices should use to connect. The session host therefore identifies the specific desktop (or other hosted resource) by IP address or other address information usable by the session client to connect to that hosted service. In addition, the session host may take steps to prepare for the future incoming connection, such as breaking one or more existing connections to resources on the session host and/or opening network ports ready to receive a connection from a client device.

In step 611 lease presenter 604, using the information received from session host 606, generates a standard ICA/RDP launch file (based on the protocol in use by the session client, e.g., which could also or alternatively include PCoIP, RGS by Hewlett-Packard, and the like), and sends the launch file to the session client. The lease presenter may use the lease token to determine the parameters for a conventional launch, in combination with the additional information received from the session host, thereby enabling backwards compatibility with session client (endpoint) devices that are unaware of connection leases. The session client thus received from the lease presenter the same sort of file expected to be received in response to the session client's initial request to connection broker 401. The session client then uses the received launch file in step 613 to establish the session with the session host and, more specifically, with the specific hosted services (desktop, application, etc.). Using the method of FIG. 6, an existing legacy session client can establish a session using the lease token methods and systems described herein. The session host can autonomously determine the validity of the lease and whether to permit the session connection, without communicating with the connection broker.

According to some aspects, the session host may be configured with software to accept connection leases and respond as described herein. According to other aspects, a layer of abstraction may be added to session hosts, similar to the layer of abstraction added to session clients discussed above. That is, where a session client is not a lease-aware client, the lease presenter 604 acts as an intermediary on behalf of the session client to help establish the connection based on a lease token. Similarly, in some aspects a "lease receiver" may be configured to operate with session hosts that are not independently lease-aware devices. Stated differently, in some aspects the session host functionality may be separated from the component to which leases are presented.

Figure 7:
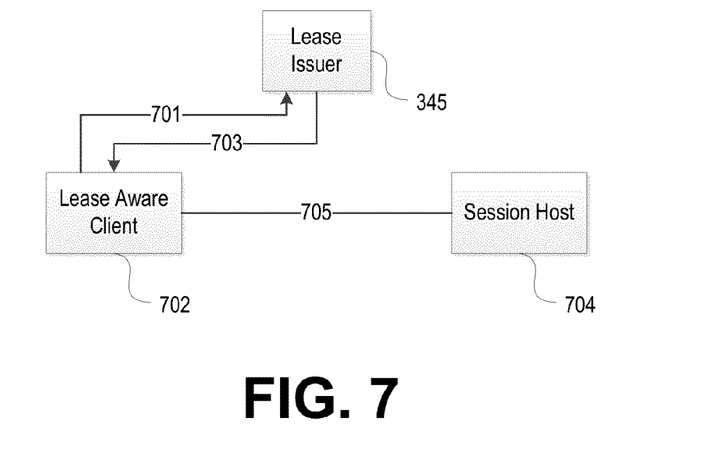
FIG. 7 illustrates a data flow diagram for a method using connection leases by a lease-aware session client, according to one or more illustrated aspects described herein.

According to an alternative aspect, with reference to FIG. 7, lease-aware session clients may be deployed that include the functionality of the lease presenter 604 (FIG. 6). In this example, in step 701 lease-aware client 702 initially contacts connection broker 401, as lease issuer, for a connection lease. In step 703 connection broker 401 generates the lease token and returns the lease token to lease-aware client 702. Connection broker may also store a copy of the lease token in one or more other redundant lease stores (not shown).

In step 705 lease aware client 702 presents the lease token, along with any required authorization credentials, to session host 704. Session host 704 validates/authenticates the token, and provides any additional information to client 702 that may be needed to establish the connection between client 702 and a specific resource identified in the lease token, e.g., a specific desktop, application, etc. Client 702 then establishes the session based on the additional information received from the session host 704.

While the methods of FIG. 6 and FIG. 7 depict two illustrative examples, other variations may be made without departing from the spirit or scope of advances described herein. For example, a lease token (or a separate lease) may include information to authorize a network connection through a security device, such as an access gateway, in which case the lease may be presented to the gateway as part of establishing the connection with the session host. In addition, cryptographically signed lease token presented to the security device may include the host (or hosts) and network ports to which the lease presenter is permitted access, so the gateway may restrict network access to just those hosts.

In another aspect, the connection lease (or a separate lease) may include the address (or addresses) of services that can boot session hosts, so that that if the required session hosts are powered off, upon presentation of an appropriate lease the lease presenter may request specific session hosts to be booted. In this case, the lease may include a hardware and/or VM identifier for session hosts.

In yet other aspects, some information in the connection lease may be encrypted to prevent information disclosure to less-trusted components, such as client (endpoint) devices. In such an example, some information may remain unencrypted, e.g., information about the validity period of the lease (if any), and the nature and addresses of any services to which the lease may be presented (gateway devices, boot services or session hosts), so that the lease presenter can determine whether the lease token is suitable for its purposes or not.

Lease issuance and renewal. Leases may be issued a-priori, or on demand. As an administrator determines who is permitted to connect to which resources, the Lease Issuer may pro-actively create leases and place them in the lease store without waiting for a specific connection request from a session client. Alternatively, leases may be issued as a user requests a connection to a particular resource, or the first time that a user requests a connection to a particular session host.

Similarly, leases may be renewed (by being re-issued) pro-actively or on-demand. To ensure continuous availability, leases may be renewed before they expire. The renewal may be initiated by the lease issuer acting autonomously, or by the lease presenter determining that a new renewed lease is desirable. The lease issuer may include information in the lease, for the benefit of the lease presenter, indicating when the lease should be renewed.

Lease revocation. Once a lease is issued in the form of a lease token, it is possible that the lease should be revoked before the lease expires. That is, leases may need to be revoked when an administrator removes a user's access to a session host (or application). A lease may also need to be revoked based on deprovisioning a user from the overall system (such as for terminated employees), or when a session host is deprovisioned or taken offline. Leases may also need to be revoked based on policy considerations, such as when users only need to have access to a session host for limited period of time, or based on user behavior where a lease would be revoked after a certain period of inactivity.

Leases may be revoked in various ways. Where a user or session host is deprovisioned, the lease simply will not work because one of the relevant connection endpoints no longer exists on the system. In another scenario, a lease may be revoked based on a unique identifier 523 associated with each lease token. A list of revoked identifiers may be distributed to appropriate session hosts (those identified in the lease), so session hosts can autonomously decline revoked leases if or when presented to that session host. Alternatively, a list of revoked identifiers may be stored in a central location (at the lease store, lease issuer, etc.), and each session host queries the central repository using a lease's unique identifier, when presented, to confirm whether the lease is valid or whether the lease has been revoked. In another example, a lease may be revoked based on the cryptographic key used to sign the lease having been revoked. The cryptographic key may be revoked using standard technologies, such as X509 certificates and certificate revocation lists (CRLs) used to manage cryptographic key revocation. Any of the above revocation methods may be used in combination, or separately, to control lease revocation.

Using one or more aspects described above, the use of connection leases and lease tokens provides greater resilience by reducing the dependence of virtualization systems on central infrastructure and single points of failure, and further provides the ability to scale up quickly and easily for managed hosted applications and desktops. The ability to scale up results from a connection broker being queried less often per session client. As a result a single connection broker has the ability to service a much larger number of session clients when using connection leases and lease tokens as described herein, as opposed to prior art inline connection broker architectures.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:
1. A method of establish a session in a virtual desktop infrastructure, comprising steps of:
    a connection broker receiving a request for a session from a client device;
    the connection broker determining, based on an identification of the client device, one or more session hosts the client device is authorized to access, and one or more resources the client device is authorized to use on the one or more session hosts;

the connection broker generating a lease token based on the client device, the one or more session hosts, and the one or more resources, wherein the lease token is a self-sustaining package of cryptographically signed connection lease data from which each of the one or more session hosts can determine whether the client device is authorized to access the one or more resources hosted by that session host;

the connection broker sending the lease token for storage in a lease store;

receiving, by one of the session hosts, the lease token as a request to establish a session with the client device;

the session host validating the lease token based on the cryptographic signature of the lease token;

based on the validating, the session host sending connection information for use by the client device to establish a session with the session host; and establishing the session between the session host and the client device through which the client device accesses one or more resources hosted by the session host.

2. The method of claim 1, wherein one of said one or more resources is a hosted desktop.

3. The method of claim 1, wherein one of said one or more resources is a hosted application.

4. The method of claim 1, wherein one of said one or more resources is a virtual channel.

5. The method of claim 1, further comprising revoking the lease token by publishing a lease number corresponding to the lease token to a predetermined location.

6. The method of claim 1, wherein the lease token comprises a plurality of data fields each identifying a different one of:
- a lease ID number;
- the client device;
- the one or more session hosts;
- the one or more resources;
- one or more access conditions that must be met prior to allowing the client device to access the one or more session hosts;
- a connection limit;
- a maximum idle time;
- a maximum disconnect time;
- virtual channel control information; and
- a signature of the connection broker verifying that the lease token originated with the connection broker.

7. One or more non-transitory computer readable media storing computer executable instructions that, when executed, cause a system to perform:

receiving a request for a session from a client device;

determining, based on an identification of the client device, one or more session hosts the client device is authorized to access, and one or more resources the client device is authorized to use on the one or more session hosts;

generating a lease token based on the client device, the one or more session hosts, and the one or more resources, wherein the lease token is a self-sustaining package of cryptographically signed connection lease data from which each of the one or more session hosts can determine whether the client device is authorized to access the one or more resources hosted by that session host;

sending the lease token for storage in a lease store;

receiving the lease token as a request to establish a session with the client device;

validating the lease token based on the cryptographic signature of the lease token;

sending, based on the validating, connection information for use by the client device to establish a session; and establishing the session between a session host and the client device through which the client device accesses one or more resources hosted by the session host.

8. The computer readable media of claim 7, wherein one of said one or more resources is a hosted desktop.

9. The computer readable media of claim 7, wherein one of said one or more resources is a hosted application.

10. The computer readable media of claim 7, wherein one of said one or more resources is a virtual channel.

11. The computer readable media of claim 7, said instructions further causing the system to perform revoking the lease token by publishing a lease number corresponding to the lease token to a predetermined location.

12. The computer readable media of claim 7, wherein the lease token comprises a plurality of data fields each identifying a different one of:
- a lease ID number;
- the client device;
- the one or more session hosts;
- the one or more resources;
- one or more access conditions that must be met prior to allowing the client device to access the one or more session hosts;
- a connection limit;
- a maximum idle time;
- a maximum disconnect time;
- virtual channel control information; and
- a signature of the connection broker verifying that the lease token originated with the connection broker.

13. A system comprising:

one or more session host devices; and a connection broker device comprising a memory storing executable instructions which, when executed, configure the connection broker device to receive a request for a session from a client device, wherein the instructions further configure the connection broker device to determine, based on an identification of the client device, one or more of the session hosts the client device is authorized to access, and one or more resources the client device is authorized to use on the one or more authorized session hosts, wherein the instructions further configure the connection broker device to generate a lease token based on the client device, the one or more authorized session hosts, and the one or more resources, wherein the lease token is a self-sustaining package of cryptographically signed connection lease data from which each of the one or more authorized session hosts can determine whether the client device is authorized to access the one or more resources hosted by that session host, and wherein the instructions further configure the connection broker device to send the lease token for storage in a lease store;

wherein each authorized session host comprising a memory storing executable instructions which, when executed, configure the session host device to receive the lease token as a request to establish a session with the client device, to validate the lease token based on the cryptographic signature of the lease token and, based on the validating, to send connection information for use by the client device to establish a session with the authorized session host; and wherein the instructions further configure the authorized session host to establish the session between the authorized session host and the client device through which the client device accesses one or more resources hosted by the session host.

14. The system of claim 13, wherein one of said one or more resources is a hosted desktop.

15. The system of claim 13, wherein one of said one or more resources is a hosted application.

16. The system of claim 13, wherein one of said one or more resources is a virtual channel.

17. The system of claim 13, wherein the instructions further configure the connection broker device to revoke the lease token by publishing a lease number corresponding to the lease token to a predetermined location.

18. The system of claim 13, wherein the lease token comprises a plurality of data fields each identifying a different one of:
 a lease ID number;
 the client device;
 the one or more session hosts;
 the one or more resources;
 one or more access conditions that must be met prior to allowing the client device to access the one or more session hosts;
 a connection limit;
 a maximum idle time;
 a maximum disconnect time;
 virtual channel control information; and
 a signature of the connection broker verifying that the lease token originated with the connection broker.

19. The system of claim 13, wherein the connection broker device and each session host comprise separate logical devices.

20. The system of claim 13, wherein the connection broker and one or more of the session hosts comprise separate physical devices.

* * * * *